UNITED STATES PATENT OFFICE.

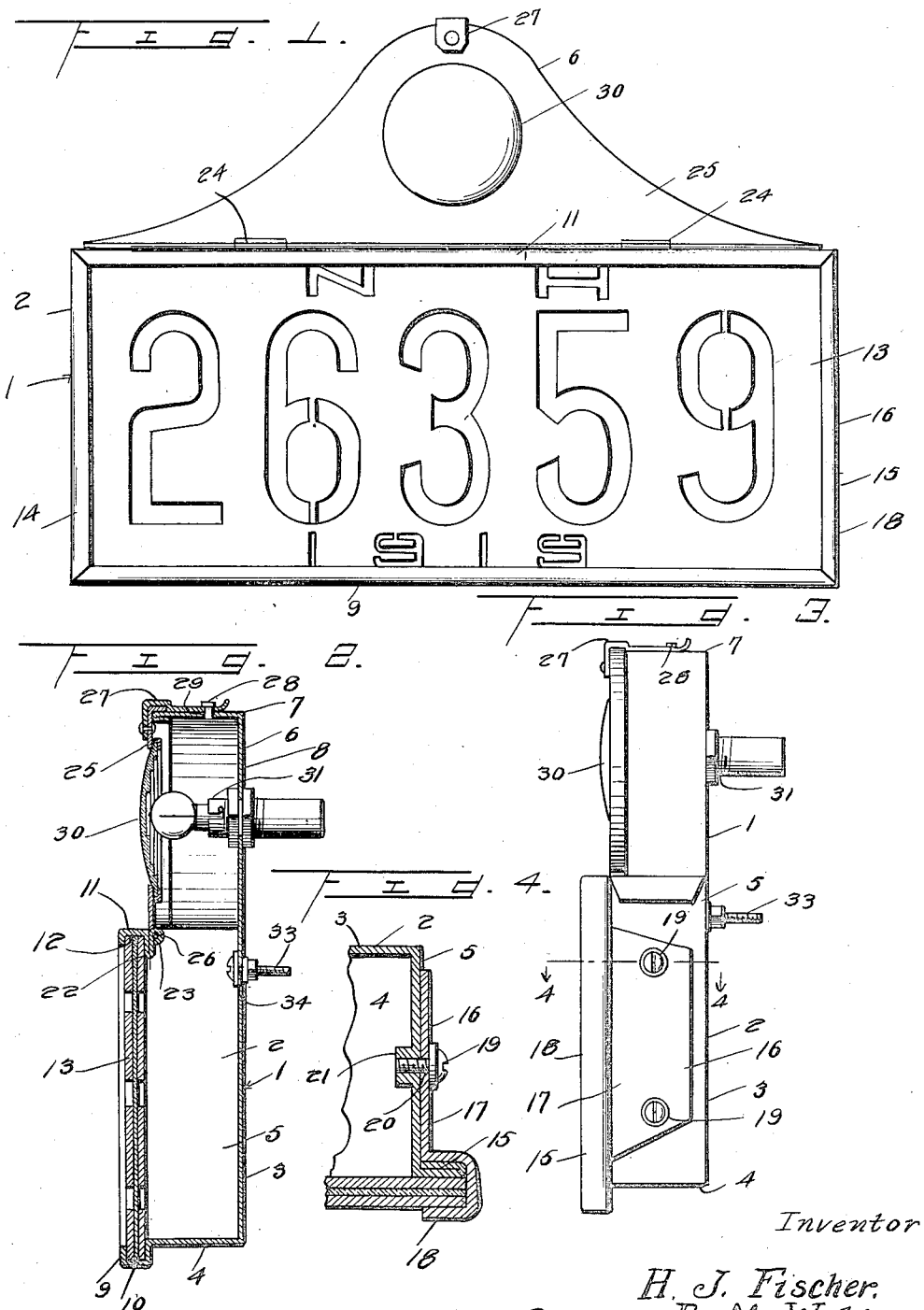

HENRY J. FISCHER AND BERNHARD M. WOLF, OF MANCHESTER, NEW HAMPSHIRE.

HOLDER AND ILLUMINATOR FOR NUMBER-PLATES.

1,392,751.   Specification of Letters Patent.   Patented Oct. 4, 1921.

Application filed November 19, 1919. Serial No. 339,015.

*To all whom it may concern:*

Be it known that we, HENRY JOHN FISCHER and BERNHARD M. WOLF, citizens of the United States, residing at Manchester, in the county of Hillsborough and State of New Hampshire, have invented certain new and useful Improvements in Holders and Illuminators for Number-Plates; and we do hereby declare the following to be a full, clear, and exact description of the invention, such as will enable others skilled in the art to which it appertains to make and use the same.

This invention relates to number or license plates for automobiles and the primary object of the invention is to provide an improved means for detachably supporting and illuminating the license plates so that the same will appear distinct at a comparatively great distance.

Another object of the invention is to provide a casing arranged for the license plate and rear signal said casing having a common means for illuminating the plate and signal.

A further object of the invention is to provide an improved means for detachably connecting the license plate to the holder, so that the same can be readily removed when so desired.

A still further object of the invention is to provide a license plate holder of the above character, which is durable and efficient in use, and one that is simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, forming a part thereof, in which:

Figure 1 is a front elevation of the improved license plate holder.

Fig. 2 is a central vertical section through the same.

Fig. 3 is a side elevation of the same.

Fig. 4 is a detail horizontal section taken on the line 4—4 of Fig. 1.

Referring to the drawings in detail, wherein similar reference characters designate corresponding parts throughout the several views, the numeral 1 generally indicates the improved license plate holder, formed from a substantially rectangular casing 2 which includes the rear wall 3, the lower wall 4, and end walls 5. The rear wall 3 is provided with a centrally disposed outward extension 6 having associated therewith the wall 7, which forms the upper wall for the casing. The extension 6 and walls 7 form a sub-compartment 8, the purpose of which will be hereinafter more fully described. The lower wall 4 is provided with upstruck portions 9, which forms a longitudinally extending channel 10 and the upper forward end of the end walls 5 have secured thereto a U-shaped strip 11 which forms a longitudinally extending guide channel 12, which is adapted to coöperate with the guide channel 10 for receiving the license plates 13, which will be hereinafter more fully described. The one end wall 5 is provided with an upstruck portion 14, which forms a guide channel and is adapted to retain the license plate from moving in one direction. The opposite end wall is provided with a right angular extending flange 15, which the opposite edge of the license plate engages. The license plate 13 is held against movement out of the guide channels 10 and 12 by means of a removable clamp 16, including a body plate 17 having upstruck portions 18 which are adapted to overlie the right angle extending flange 15 and overlie the license plate. The clamp is held in position by set screws 19 which extend through openings 20 in the clamp into threaded sockets 21 formed in the end walls.

It can be seen, that when the upper plate 13 is removed and placed in position, it is merely necessary to loosen the set screws 19 and remove the clamp from position. This permits the license plate to be slid out of the guide channels 10 and 11.

The U-shaped strip 11 has secured thereto at spaced points inwardly extending clamps 22 which are rolled to provide hinged barrels 23, which are adapted to aline with the hinged barrels 24 formed on the front cover 25, which is adapted to completely close the sub-compartment 8. A longitudinally extending pivot pin 26 extends through the hinged barrels and pivotally securing the cover 25 in position. The cover 25 has secured to the upper end portion thereof a rearwardly extending spring clip 27, carrying an inwardly extending pin 28 which is adapted to fit in an opening 29 formed in the upper wall 7. It can be seen that the spring clip can be arranged, so as to lift the pin out of engagement with the opening thus permitting the front cover to be readily swung on the pivot pin. The front cover 25 is provided with a centrally disposed opening, in which is positioned a colored lens 30 which constitutes the rear signal for the machine. Any preferred type of lamp socket 31 may be employed for illuminating the casing and the colored lens. It will be seen that by referring to Fig. 2 that the lamp is positioned directly behind the lens section and carried by the rear walls.

The casing is adjustably held in position on the ordinary brackets (not shown) carried by the usual motor vehicle by bolts 33 which extend through slots 34 formed in the rear walls. The slots permit the bolts to be adjusted longitudinally, so as to conform to the desired brackets (not shown) carried by the motor vehicle.

From the foregoing description it can be seen that an improved and simple form of license plate holder is provided, which will respectively illuminate the plate and rear signal. The license plates 13 can be formed of tin having the numbers stamped out of the same, or made of leatherboard having the numbers cut out and having interposed between the same a sheet of celluloid 36. Any other translucent material may be interposed between the leatherboard plates if desired.

In practice, we have found that the form of our invention illustrated in the accompanying drawings and referred to in the above description, as the preferred embodiment, is the most efficient and practical; yet realizing the conditions concurrent with the adoption of our device will necessarily vary, we desire to emphasize that various minor changes in details of construction, proportion and arrangement of parts may be resorted to, when required without sacrificing any of the advantages of our invention as set forth.

What is claimed as new is:—

A display device including a casing having a first section provided with a channel member and a channel member spaced from said channel member, a sign mounted in said members, the second channel member having its inner wall returned for reinforcement and shaped into an eyelet, the casing having a super-section, a closure member for the super-section serving as a signal, means pivoting the closure member to the eyelet, and fastening means associated with the closure and the super-section.

In testimony whereof we affix our signatures in presence of two witnesses.

HENRY J. FISCHER. [L. S.]
BERNHARD M. WOLF. [L. S.]

Witnesses:
J. ALBERT MARSHALL,
CAMILLE ZING.